(12) United States Patent
McRae et al.

(10) Patent No.: US 7,924,815 B2
(45) Date of Patent: Apr. 12, 2011

(54) UPSTREAM DATA RATE ESTIMATION

(75) Inventors: Matthew McRae, Laguna Beach, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 1190 days.

(21) Appl. No.: 11/130,333

(22) Filed: May 16, 2005

(65) Prior Publication Data
US 2006/0256775 A1 Nov. 16, 2006

(51) Int. Cl.
*H04L 12/66* (2006.01)
(52) U.S. Cl. ............. 370/352; 370/395.64; 379/88.17
(58) Field of Classification Search .......... 370/352–356; 379/233, 232, 88.17
See application file for complete search history.

(56) References Cited

U.S. PATENT DOCUMENTS

| | | | | |
|---|---|---|---|---|
| 4,780,883 A | * | 10/1988 | O'Connor et al. | 375/219 |
| 4,862,464 A | * | 8/1989 | Betts et al. | 714/795 |
| 6,002,671 A | * | 12/1999 | Kahkoska et al. | 370/248 |
| 6,678,735 B1 | * | 1/2004 | Orton et al. | 709/230 |
| 7,010,026 B1 | * | 3/2006 | Hjartarson et al. | 375/220 |
| 7,065,191 B2 | * | 6/2006 | Lazarus et al. | 379/112.1 |
| 7,295,549 B2 | * | 11/2007 | Pepin et al. | 370/352 |
| 7,532,907 B2 | * | 5/2009 | Louks et al. | 455/550.1 |
| 2003/0224815 A1 | * | 12/2003 | Rodman et al. | 455/517 |
| 2008/0170500 A1 | * | 7/2008 | Ito et al. | 370/235 |

* cited by examiner

*Primary Examiner* — Simon Sing
(74) *Attorney, Agent, or Firm* — Haynes & Boone, LLP.

(57) ABSTRACT

In one embodiment, a VoIP device operable to estimate an upstream data rate for a network device is provided. The VoIP device includes a transceiver operable to transmit VoIP packets to and receive VoIP packets from the network device; and a logic engine configured to initiate a series of simulated VoIP streams through the network device to a VoIP call destination, the logic engine being further configured to determine when at least one of the simulated VoIP streams in the series is unsuccessful, the logic engine being further configured to estimate the upstream data rate for the network device based upon a data rate for those simulated VoIP streams preceding the unsuccessful simulated VoIP stream.

18 Claims, 6 Drawing Sheets

UPSTREAM DATA RATE ESTIMATION

TECHNICAL FIELD

This invention relates generally to networks, and more particularly to the estimation of the upstream data rate for users in a broadband network.

BACKGROUND

Voice over IP (VoIP) has the capability of substantially lowering costs with respect to traditional telephone service. Rather than use conventional analog telephone lines, a user having a VoIP-enabled telephone or device connects with other callers through the digital lines supported by the Internet. Because the connection is digital, a VoIP-enabled phone offers features and services that a conventional telephone typically cannot, such as sending images or videos in conjunction with voice communication. Moreover, as is the case with conventional Web-browsing, VoIP calls have the potential for the same toll, regardless of the length of the conversation and the distance called.

Although VoIP telephony has great potential, it also faces considerable technical challenges. In traditional telephony, a call is placed over a dedicated circuit. The traditional telephone network provides resources that guarantee the voice quality over this dedicated circuit set up to support the telephone call. In contrast, communication over the Internet is packet-based. Each packet has two parts: an information payload and meta-data such as the destination address. On the Internet, packets are forwarded by routers based upon the destination address. Each packet making up digital content could thus be sent from a source to a destination address over independent paths with arbitrary delays—there is no dedicated circuit as is the case for traditional telephony. The absence of a dedicated circuit does not impact traditional Web-browsing, however. A user wishing to download a webpage can wait until the various packets making up the webpage's content are routed through the Internet and then re-assembled to present the desired content.

But effective voice communication cannot occur with arbitrary delays on the digitized voice messages. Instead, effective voice communication can tolerate a maximum of approximately 100 to 150 milliseconds of delay between the time speech is uttered and the time it is heard by the listener. Greater delays hinder communication and violate the users' real-time expectations. But packets themselves hinder real-time communication. For example, suppose a VoIP protocol uses 500-byte packets. Assuming that voice is digitized at 8000 one-byte samples per second, each 500-byte packet would take 62.5 milliseconds to fill. Over 60% of the entire acceptable delay may thus be taken up by just filling the packet, which hasn't yet traversed the Internet. To combat this problem, specialized voice compression and VoIP protocols have been developed such as H.323.

As the use of VoIP telephony expands into the home market, it must combat the restricted data rates typically available to a home-based Internet user. For example, consider the two most-commonly-used high-speed Internet access methods available for the home user: Digital Subscriber Line (DSL) and cable modem services. For both services, the available data rates and corresponding bandwidths are typically asymmetrically proportioned such that a user has a greater downstream data rate than an upstream data rate. This asymmetric division satisfies a typical Web-browser's needs in that content generally flows downstream from webpages to a user's web-browser rather than in the upstream direction. Depending upon the subscription purchased, a DSL provider will offer varying data rate packages to its users. For example, a DSL provider may offer a standard package providing a downstream data rate of 512 kbps and an upstream data rate of 128 kbps. In contrast to the conventional package just described, "premium" packages would offer greater downstream and upstream data rates, albeit in analogous asymmetric proportions. The upstream data rate for a cable modem service is more nebulous in that cable modem services do not offer the fixed data rates that DSL services can offer. Instead, the available data rate for a cable modem is affected by the use of the cable by others and will thus vary depending upon cable traffic. However, cable modems typically proportion the available data rate for any given user in an asymmetric fashion between upstream and downstream uses. Thus, typical upstream cable modem data rates will also often be in the range of 128 kbps.

As discussed above, the acceptable delay for VoIP telephony is approximately 100 to 150 milliseconds. The limited upstream data rate typically provided by high-speed Internet access methods such as DSL and cable modems is a factor in this delay. If too little upstream data rate is available, the voice data rate is slowed such that the acceptable delay limit will be violated. For example, VoIP implemented with a G.711 codec requires up to 100 kbps in upstream data rate. But note that a VoIP caller may also be emailing others while speaking. In particular, recall that VoIP also supports the sending of digital content such as video in addition to the voice communication. Thus, a VoIP call may also compete for the limited upstream data rate with the presence of other digital content being transmitted upstream. In addition, the VoIP caller may be sharing a modem with other users on a LAN who happen to be uploading content. Depending upon the available upstream data rate, the data rate of content besides voice data may need to be limited to provide adequate VoIP telephony service.

Accordingly, there is a need in the art for improved VoIP systems that can estimate their available upstream data rate and adjust the upstream voice and non-voice data loads accordingly.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Figure 1:
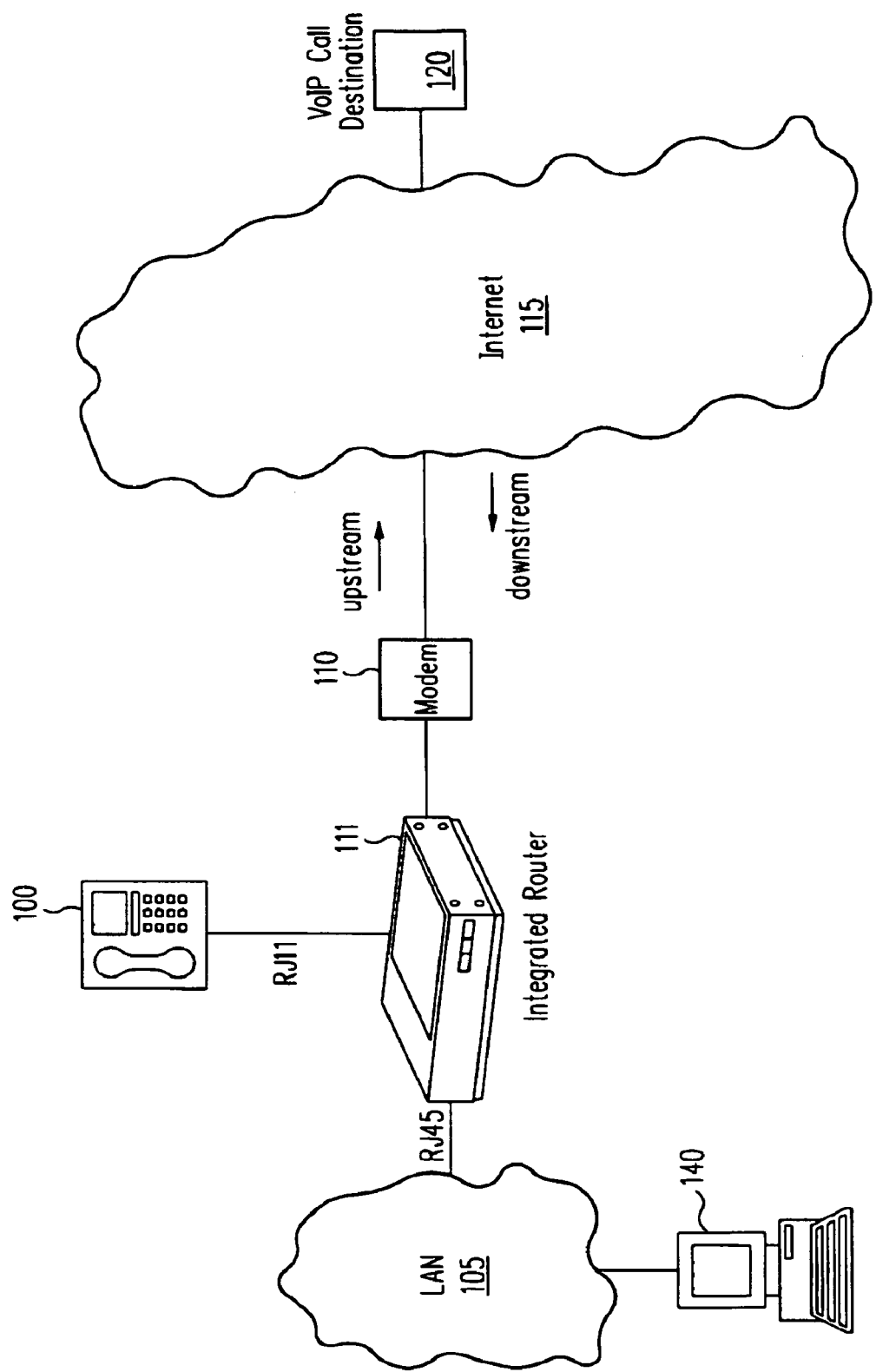
FIG. 1 is a block diagram illustrating a system including a VoIP-integrated router that estimates an upstream data rate of a network device such as a modem in accordance with an embodiment of the invention.

Turning now to FIG. 1, an exemplary embodiment of the present invention is illustrated. A modem 110 allows users on a LAN 105 to access content on Internet 115 through. Modem 110 can be any suitable modem such as a DSL modem or a cable modem. As discussed previously, modem 110 has a limited upstream data rate supporting the transmission of digital content to a voice-over-IP (VoIP) destination. Typically, this limited upstream data rate would be less than the downstream data rate over which modem 110 may receive content from Internet 115. However, it will be appreciated that the present invention may be used to estimate the upstream data rate for modem 110 regardless of the relationship between the upstream and downstream data rates.

An integrated router 111 provides the interface between users on LAN 105 and nodes on Internet 115. Integrated router 111 may also be denoted as a residential gateway. The upstream data rate estimation disclosed herein is described with respect to an "initiator." For the embodiment illustrated in FIG. 1, it is convenient to use integrated router 111 as the initiator. However, it will be appreciated that the initiator may comprise other devices. Router 111 is an integrated router in that it supports VoIP calls as well. Thus, integrated router 111 includes an analog port such as an RJ11 port over which it may communicate with a conventional analog telephone 100. Integrated router 111 includes other ports such an Ethernet RJ45 port over which it communicates with devices on LAN 105 such as a processor 140. These devices on LAN 105 generate IP data packets that integrated router 111 transmits through modem 110 to upstream destinations on Internet 115. In addition, integrated router 111 transmits VoIP packets to a VoIP call destination 120. As discussed previously, to satisfy quality of service (QoS) expectations for voice communications, VoIP requires a certain upstream data rate capability for modem 110—for example, VoIP implemented with a G.711 codec may require up to 100 kbps in upstream data rate. To measure the upstream data rate for modem 110 so that non-VoIP data traffic may be limited accordingly, integrated router 111 initiates the measurement by transmitting a simulated VoIP stream to VoIP call destination 120. VoIP call destination 120 is any suitable node on the Internet configured to receive the simulated VoIP streams.

The nature of the simulated VoIP call depends upon the particular VoIP protocol implemented in router 111 (as initiator) and VoIP call destination 120 (as receiver). For example, if integrated router 111 implements a SIP User Agent Client (UAC) and VoIP call destination 120 implements a SIP User Agent Server (UAS), the simulated VoIP call would use SIP signaling. Alternatively, should integrated router 111 implement an H.323 terminal and VoIP call destination 120 also implement an H.323 terminal, the simulated VoIP call would use H.323 signaling. In addition, should both integrated router 111 and VoIP call destination 120 implement an MGCP media gateway, the simulated VoIP call would use MGCP signaling. Common to each simulated call and each signaling protocol would be a simulated VoIP audio stream over Real Time Protocol (RTP). The audio stream is the media path between router 111 (as transmitter) and VoIP call destination 120 (as receiver) and is transmitted on the upstream data path whose capacity is to be measured or determined. It is the audio stream that provides the loading of the upstream path as opposed to the call signaling.

Figure 2:
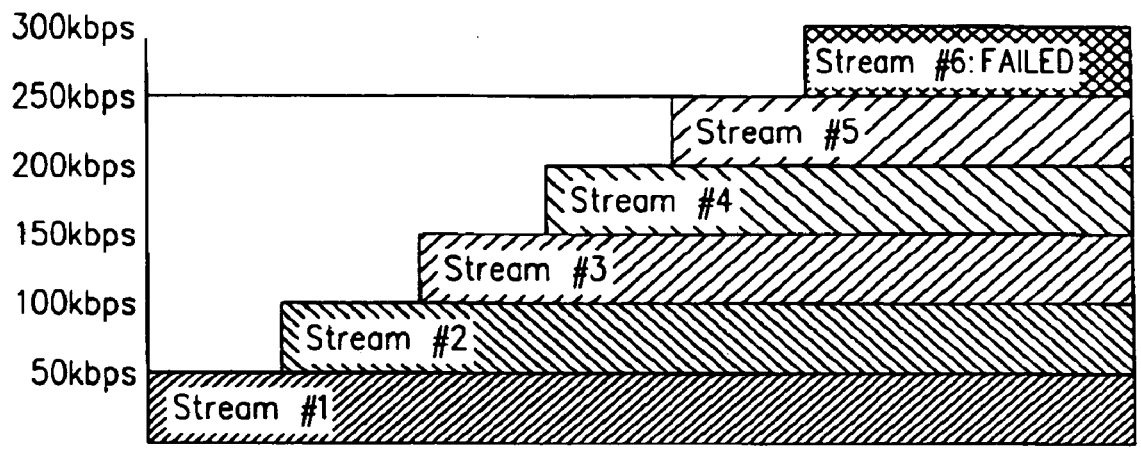
FIG. 2 is a graphical representation of an upstream data rate estimation technique using an increasing number of simulated VoIP streams in accordance with an embodiment of the invention.

The determination of the upstream data rate using simulated VoIP streams may be performed using a number of alternative embodiments. For example, integrated router 111 may initiate an increasing number of calls as illustrated in FIG. 2. During this process, integrated router 111 prevents any other data traffic from using the upstream path through modem 110. The audio stream for each call has a known data rate. It is convenient to use the same data rate for each audio stream but it will be appreciated that the data rates may be varied as well. A particularly convenient data rate is one that matches the expected data rate of a typical VoIP call. Such a data rate depends upon the CODEC (coder-decoder) compression scheme implemented in integrated router 111. For example, a G.729 CODEC introduces more compression than a G.711 CODEC. Thus, a typical stream data rate for a G.729 CODEC would be less than a typical stream data rate for a G.711 CODEC. For example, a typical data rate for a G.711 CODEC may be 64 kbps whereas that for a G.729 CODEC may be 8 kbps. It is worthwhile to note that these data rates are before encapsulation into packets for transmission on the broadband connection. The encapsulation thus adds to the overall data rate. For example, VoIP implemented with a G.711 CODEC may require up to 100 kbps in upstream data rate after encapsulation whereas a G.729 CODEC may require up to 40 kbps in upstream data rate after encapsulation.

If a G.729 CODEC is implemented in router 111, each simulated stream may be 40 kbps as shown in FIG. 2. As each test call (and corresponding audio stream) is established, the overall data rate for the upstream combination increases by 40 kbps. Thus, after the sixth stream is established, the overall data rate is 240 kbps. Each stream will be verified a success before creating the next stream by, for example, analyzing the returned traffic and verifying acceptable packet loss and jitter. The time required for such analysis may vary depending on the CODEC or call size but the next stream could be started once the setup of the previous call is complete or a few seconds after. Should the initiator fail to establish the seventh stream (i.e., the network denies admission), it may be assumed that the viable upstream data rate for modem 110 is 240 kbps. However, this upstream capacity could also be valued as possessing a viable upstream "call capacity" of six G.729 calls.

Figure 3:
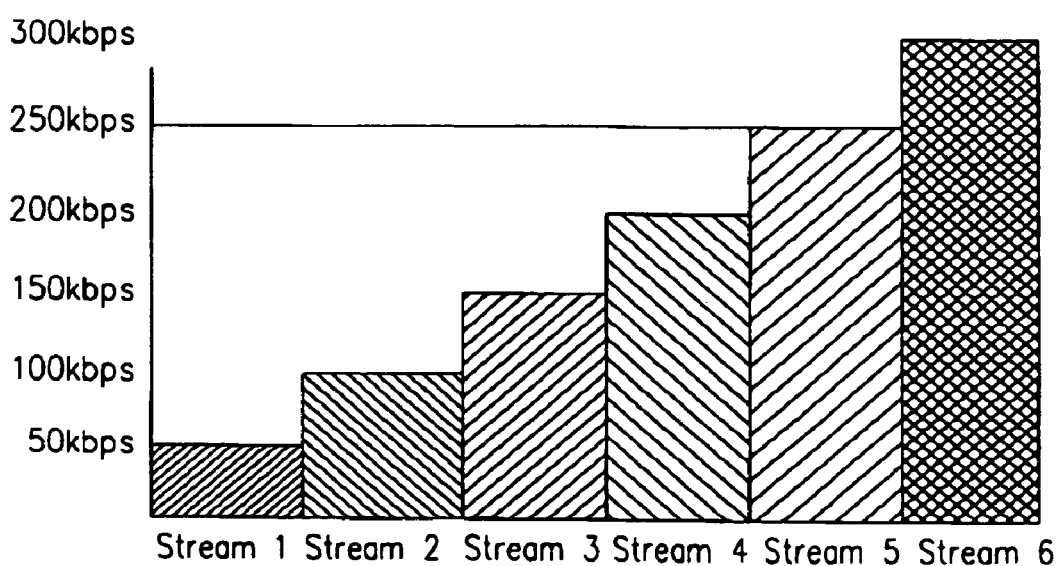
FIG. 3 is a graphical representation of an upstream data rate estimation technique using a series of successive simulated VoIP streams in accordance with an embodiment of the invention.

In an alternative embodiment, a VoIP stream initiator such as integrated router 111 would establish a series of simulated VoIP streams with VoIP call destination 120 as illustrated in FIG. 3. As discussed with respect to FIG. 2, integrated router 111 would be configured to inhibit other data traffic through the upstream path for modem 110 during the upstream capacity evaluation process. If a G.729 CODEC is implemented in integrated router 111, a typical stream data rate may be 40 kbps as also discussed above. Thus, as shown in FIG. 3 the first data stream may be 40 kbps. The first stream may then be discontinued and replaced by a second stream having a higher data rate. A convenient choice for the data rate increase is to use multiples of the typical stream data rate. Thus, the second stream would be 80 kbps in such an embodiment. Similarly, the third stream would be 120 kbps, and so on. Should one of the calls fail to be established, it may be assumed that the upstream data rate for modem 110 corresponds to the data rate for the preceding call. Similarly, the call capacity is equal to the number of preceding calls.

Having determined the upstream data rate for modem 110, integrated router 111 may then limit non-VoIP data traffic accordingly. This limitation is driven by the quality of service (QoS) desired for the supported VoIP calls. For example, suppose the upstream data rate was determined to be 240 kbps as discussed with respect to FIGS. 2 and 3. If the VoIP protocol and associated QoS is such that a VoIP stream may require up to 100 kbps, then integrated router 111 should limit the non-VoIP data traffic in the upstream direction through modem 110 to be no more than 140 kbps. On the other hand, if a desired VoIP QoS is satisfied by 40 kbps, the non-VoIP data traffic could be increased to 200 kbps.

Note the advantages of such an upstream data rate estimation technique. A typical user of modem 110 will not be aware of the upstream data rate available for modem 110 nor will have the technical expertise to ascertain this upstream data rate from user manuals or the like. However, as discussed previously, a certain portion of the upstream data rate must be reserved for VoIP data traffic to satisfy the expected QoS for adequate telephone service. The user then has no intelligent way to modify or configure integrated router 111 to limit other upstream data traffic to provide the desired VoIP QoS because the limitation on the other upstream data traffic will depend upon the available upstream data rate. But an integrated router 111 configured to implement the data rate estimation techniques disclosed herein eliminates the need for a sophisticated user to ascertain the upstream data rate. Moreover, no matter how sophisticated a user may be, should modem 110 be a cable modem, the upstream data rate can only be ascertained in a dynamic fashion—a cable modem user cannot be guaranteed any fixed data rate as may be the case for a DSL modem.

Figure 4:
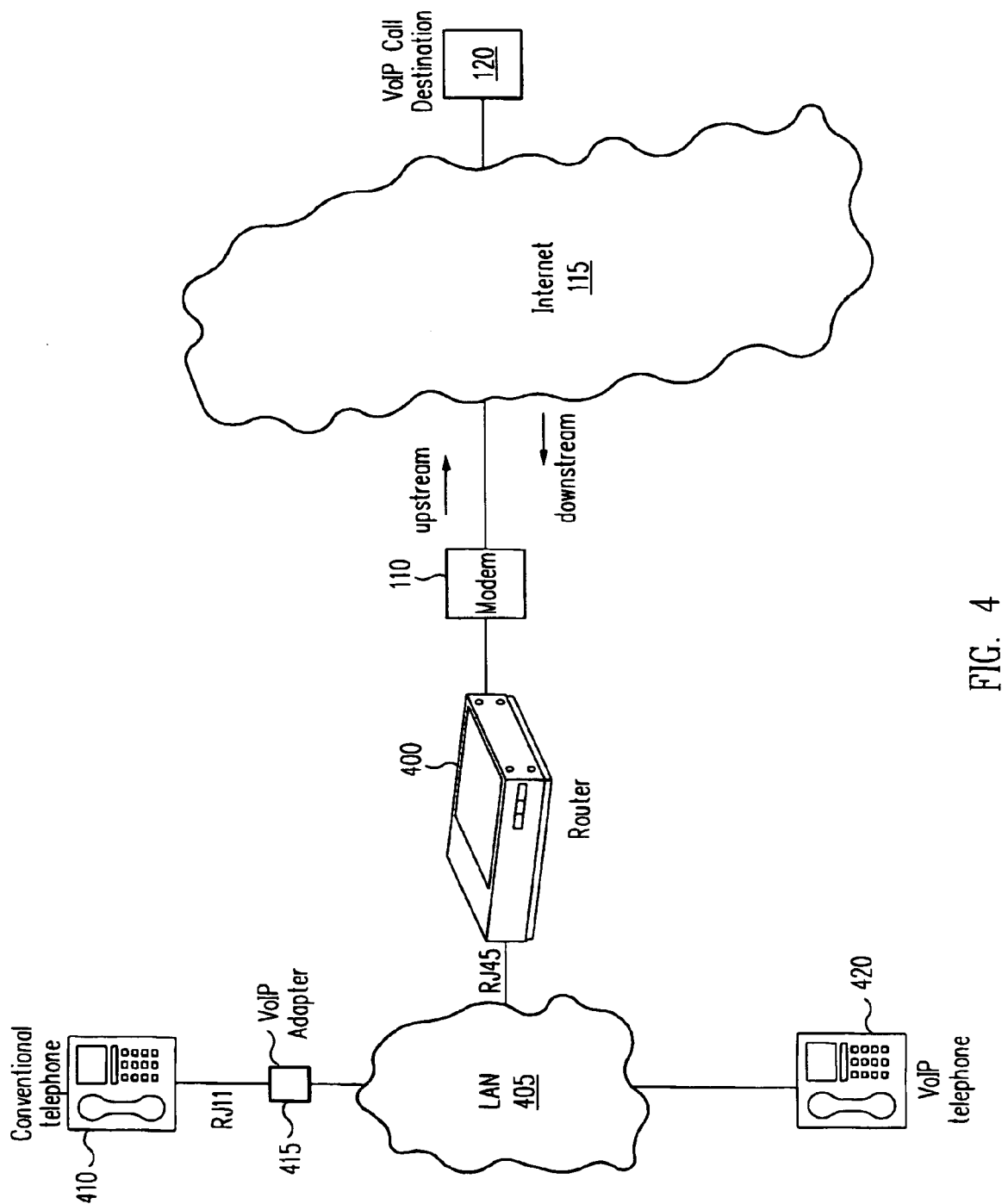
FIG. 4 is a block diagram illustrating a system including a router that is not VoIP-integrated, wherein the system estimates an upstream data rate of a network device such as a modem in accordance with an embodiment of the invention.

Those of ordinary skill in the art will appreciate that many modifications may be made to the embodiments described herein. For example, the upstream data rate determination technique described herein may be implemented in networks that do not incorporate an integrated router. For example, a non-VoIP-enabled router 400 may be used to connect a LAN 405 to Internet 115 as shown in FIG. 4. A user on LAN 405 may place VoIP calls using a conventional analog telephone 410 through the use of a VoIP adapter 415 as known in the art. VoIP adapter 415 converts analog signals from conventional telephone 410 into VoIP packets that are then transmitted onto LAN 405. Router 400 then forwards the VoIP packets to VoIP call destination 120 as limited by the upstream data rate of modem 110. Analogously as discussed with respect to FIG. 1, router 400 itself may initiate the transmission of simulated streams to VoIP destination 120 or it may be commanded to do so by a processor coupled to LAN 405 so that the upstream data rate for modem 110 may be estimated. Alternatively, VoIP adapter 415 may initiate the simulated VoIP calls. However, in this instance, because router 400 is not the test call initiator, router 400 needs to properly forward the test calls as if they were actual VoIP calls so that the upstream capacity may be reliably and accurately determined. This implies that VoIP adapter 415 may have to appropriately "mark" or "label" the stream packets for classification, queuing, and forwarding by router 400. Alternatively, router 400 may need to classify and forward the stream packets using some other parameter or parameters. However, it should be noted that in some embodiments, router 400 has no QoS capabilities, i.e., forwards all traffic with equal priority or has no way of knowing whether the packets it forwards are VoIP packets or conventional data packets. In such embodiments, because router 400 has no way of distinguishing VoIP and non-VoIP data traffic, it may route both types of data during upstream data rate determination. Thus, such non-QoS-enabled routers 400 also contribute to a potential upstream limitation. In other words, the accuracy of the upstream data rate estimation may be marred by the presence of non-VoIP data traffic in the upstream path. Although it is preferable to implement the upstream data rate estimation techniques described herein using an integrated or QoS-enabled router, these techniques have value even when implemented through a non-QoS-enabled router. For example, although a user will not know whether the upstream data rate estimation has been affected by the presence of non-VoIP data traffic, such a user may still has an estimate of this data rate. Based upon the estimate, a user may then voluntarily curtail non-VoIP data traffic such as by refraining from e-mailing or web browsing during a VoIP call.

Figure 5:
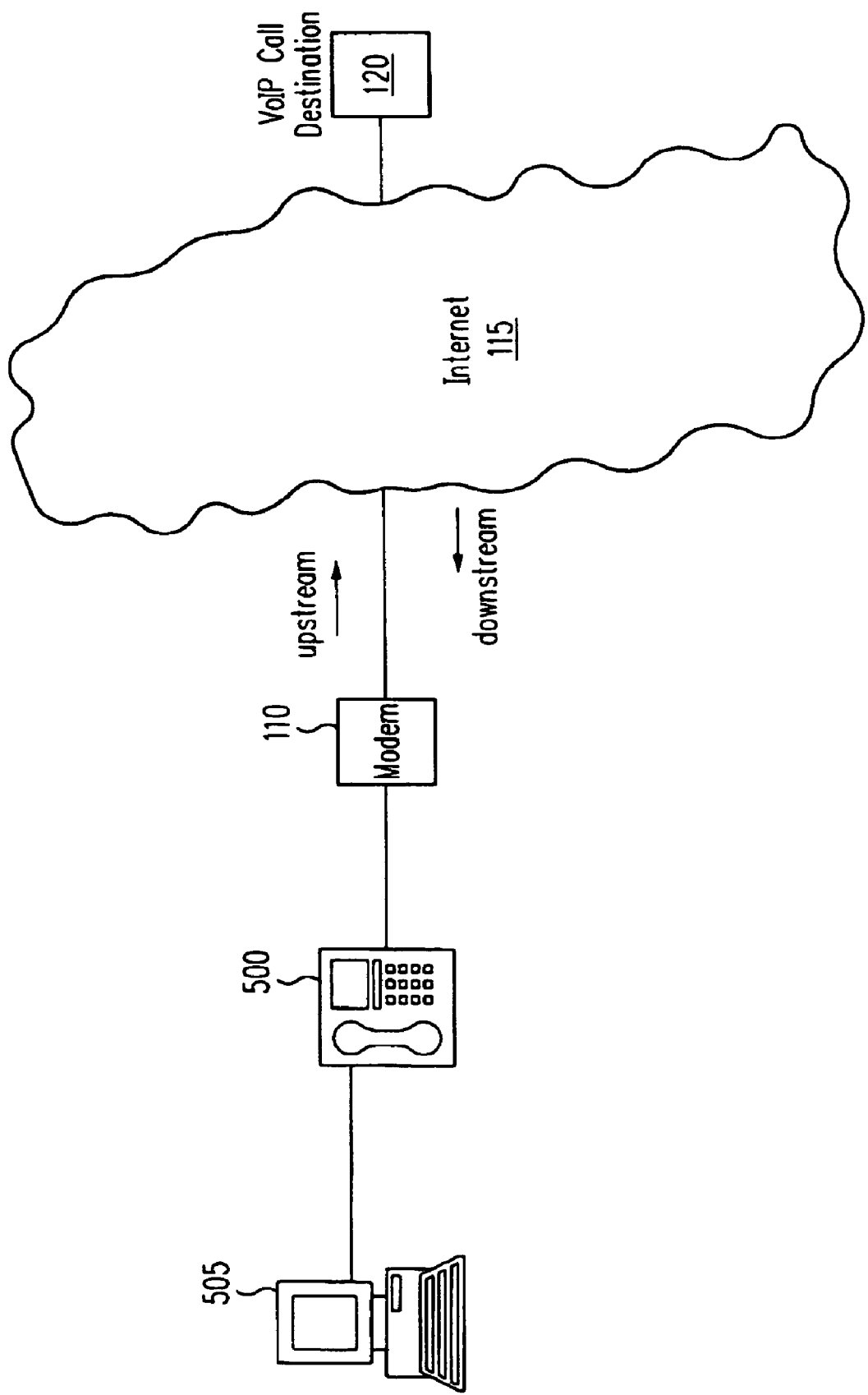
FIG. 5 is a block diagram illustrating a system including a VoIP telephone that is configured to estimate an upstream data rate of a network device such as a modem in accordance with an embodiment of the invention.

In an alternate embodiment, the upstream data rate estimation technique described herein may be performed by a VoIP telephone 500 that directly couples to modem 110 such as seen in FIG. 5. VoIP telephone 500 may also route data traffic from processor 505 as limited by the upstream data rate of modem 110. Thus, VoIP telephone 500 would be configured to initiate the simulated VoIP call streams to VoIP call destination 120. These messages may then be processed as discussed herein to calculate the modem upstream data rate. Based upon this estimation, VoIP telephone 500 would limit the transmission of non-VoIP data packets accordingly.

Figure 6:
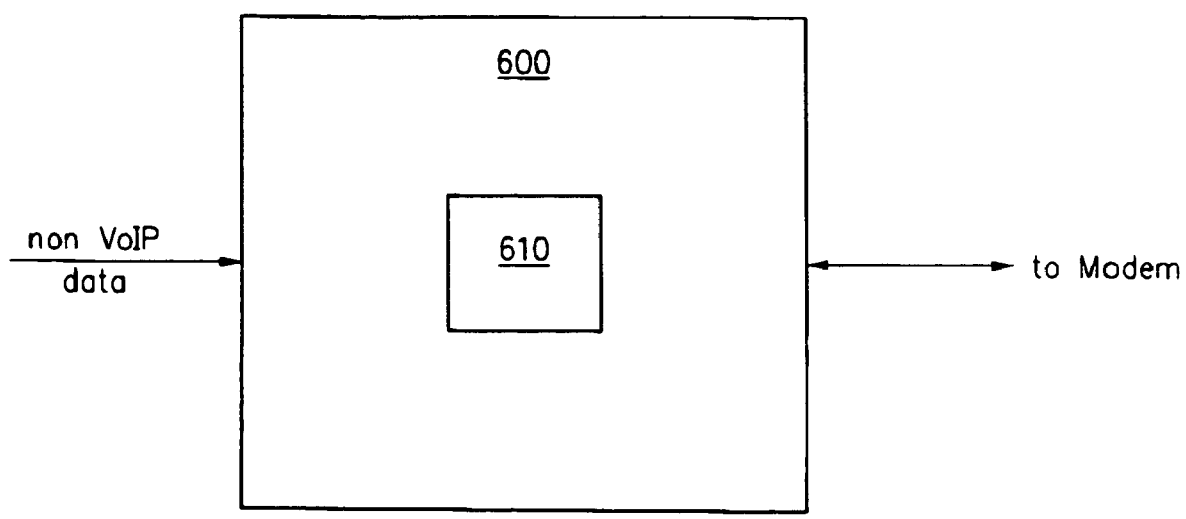
FIG. 6 is a block diagram of a network device configured to estimate the upstream data rate of another network device in accordance with an embodiment of the invention.

Although the preceding discussion has discussed the upstream data rate estimation technique with respect to routers and VoIP telephones, it will be appreciated that this technique may be implemented in any suitable network device. For example, a generic network device 600 architecture is shown in FIG. 6. Network device 600 includes a logic engine 610 configured to perform the upstream data rate procedure of the present invention. Logic engine 610 may be implemented with dedicated hardware, firmware, or with a general purpose microprocessor. Logic engine 610 estimates the upstream data rate for another network device (not illustrated). Having estimated the upstream data rate, logic engine 610 may limit the transmission of non-VoIP data traffic accordingly through the upstream path for the other network device.

Figure 7:
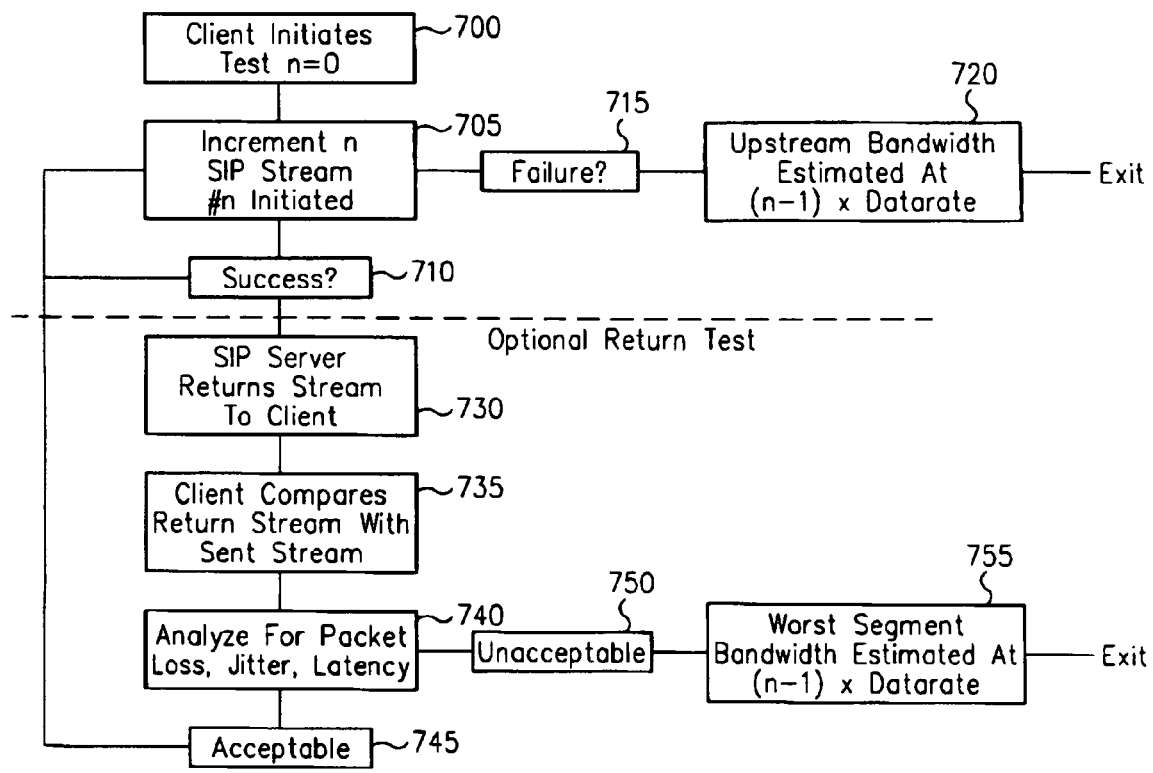
FIG. 7 is a flowchart illustrating an upstream data rate estimation method in accordance with an embodiment of the invention.

A flowchart illustrating a simulated stream data rate estimation technique is illustrated in FIG. 7. This flowchart is applicable to either of the embodiments discussed with respect to FIGS. 2 and 3. At step 700, an integer n representing the call stream number is initialized to zero. The number of calls and streams (and hence the integer n) is incremented in step 705. In this embodiment, VoIP call destination 120 is a SIP User Agent Server such that the simulated calls use SIP signaling. Should the call initiated in step 705 be placed successfully (i.e., admitted by the network in step 710), the number of calls/streams is incremented again in step 710. If, however, the call initiated in step 705 is not placed successfully (step 715), the upstream data rate may be estimated in step 720 as (n−1)*(the stream data rate). It will be appreciated that the calculation in step 720 assumes a constant data rate increase for each increment of n. In embodiments wherein the data rate increase is not constant, the calculation would have to be adjusted accordingly. Furthermore, this upstream capacity could also be valued as possessing a viable upstream "call capacity" of (n−1) calls.

Those of ordinary skill will appreciate that other data rate estimation techniques may be performed using simulated VoIP calls and streams. For example, VoIP call destination 120 may be configured to return the VoIP streams to the initiator (or to an entity co-located with the initiator) as shown in optional step 730. The initiator may then compare the received stream to the transmitted stream (as a "loop back") to ascertain levels of packet loss, jitter, latency, and/or other quality indicia in steps 735 and 740. If the returned stream is deemed acceptable (step 745), the streams may be incremented in step 705. However, if the returned stream is deemed unacceptable (step 750), the upstream data rate may be determined to be (n−1)*(stream data rate) in step 755. As discussed with step 720, such a calculation assumes that a constant data rate increase is maintained over the series of streams. Furthermore, this upstream capacity could also be valued as possessing a viable upstream "call capacity" of (n−1) calls.

Although the invention has been described with respect to particular embodiments, this description is only an example of the invention's application and should not be taken as a limitation. Consequently, the scope of the invention is set forth in the following claims.

We claim:

1. A VoIP device configured to estimate an upstream data rate of a modem through which the VoIP device accesses the Internet, comprising:
    a transceiver operable to transmit VoIP packets to and receive VoIP packets from the modem; and
    a logic engine configured to initiate a series of simulated VoIP streams through the modem to a VoIP call destination, wherein each simulated VoIP stream uses a VoIP protocol supported by the VoIP call destination, the logic engine being further configured to determine when at least one of the simulated VoIP streams in the series is unsuccessful, the logic engine being further configured to estimate the upstream data rate for the modem based upon a data rate for those simulated VoIP streams preceding the at least one unsuccessful simulated VoIP stream.

2. The device of claim 1, wherein the logic engine is further configured to limit non-VoIP data traffic on the upstream path for the modem based upon the upstream data rate estimation.

3. The device of claim 1, wherein the logic engine is further configured to Limit non-VoIP data traffic based upon a desired quality of service for VoIP telephone calls.

4. The device of claim 1, wherein the logic engine is configured to initiate the series of simulated VoIP streams such that during each successive simulated VoIP stream in the series, simulated VoIP streams preceding the successive simulated VoIP stream are maintained with the VoIP call destination.

5. The device of claim 4, wherein the logic engine is configured such that the data rate of each simulated VoIP stream is a constant, the data rate for those simulated VoIP streams preceding the unsuccessful simulated VoIP stream thus being an integer multiple of the constant, wherein the integer multiple is the number of the VoIP calls preceding the simulated VoIP stream.

6. The device of claim 1 wherein the logic engine is configured to initiate the series of simulated VoIP streams such that prior to the initiation of each successive simulated VoIP stream in the series the preceding simulated VoIP streams are terminated.

7. The device of claim 6, wherein the logic engine is configured such that the data rate of each successive simulated VoIP stream is greater than an immediately-preceding simulated VoIP stream by a constant, the data rate for those simulated VoIP streams preceding the unsuccessful simulated VoIP stream thus being an integer multiple of the constant, wherein the integer multiple is the number of the VoIP calls preceding the unsuccessful simulated VoIP stream.

8. A VoIP-integrated router operable to interface with analog telephones and digital devices, comprising:
    a transceiver operable to transmit packets to and receive packets from a modem through which the router accesses the Internet; and
    a logic engine configured to estimate an upstream data rate for the modem by performing the acts of:
    successively initiating simulated VoIP streams of a known data rate through the modem to a VoIP call destination such that the succession forms a series of simulated VoIP streams, wherein each simulated VoIP stream uses a VoIP protocol supported by the VoIP call destination;
    for each initiated simulated VoIP stream, determining whether the simulated VoIP stream was successful; and
    estimating the upstream data rate based upon the known data rates of the simulated VoIP streams preceding an unsuccessful simulated VoIP stream.

9. The VoIP-integrated router of claim 8, wherein the VoIP call destination is configured to return the simulated VoIP streams to the VoIP-integrated router, and wherein the determination of VoIP stream success comprises comparing a returned simulated VoIP stream to a corresponding transmitted simulated VoIP stream.

10. The VoIP-integrated router of claim 9, wherein the comparison comprises determining whether packet loss, jitter, and latency are within acceptable limits.

11. The VoIP-integrated router of claim 8, wherein the VoIP-integrated router is configured to also limit non-VoIP data traffic on the upstream path for the modem based upon the upstream data rate estimation.

12. The VoIP-integrated router of claim 11, wherein the limitation of the non-VoIP data traffic is also based upon a desired quality of service (QoS) for VoIP data traffic.

13. A VoIP telephone, wherein the VoIP telephone is configured to estimate an upstream data rate of a modem though which the VoIP telephone accesses the Internet by performing the acts of:
    successively initiating simulated VoIP streams of a known data rate through the modem to a VoIP call destination such that the succession forms a series of simulated VoIP streams, wherein each simulated VoIP stream uses a VoIP protocol supported by the VoIP call destination;
    for each initiated simulated VoIP stream, determining whether the simulated VoIP stream was successful; and
    estimating the upstream data rate based upon the known data rates of the simulated VoIP streams preceding an unsuccessful VoIP stream.

14. The VoIP telephone of claim 13, wherein the VoIP telephone is configured to also limit non-VoIP data traffic on the upstream path for the modem based upon the upstream data rate estimation.

15. The VoIP telephone of claim 14, wherein the limitation of the non-VoIP data traffic is also based upon a desired quality of service (QoS) for VoIP data traffic.

16. A method of estimating an upstream data rate of a modem, comprising:
    successively initiating simulated VoIP streams of a known data rate through the modem to a VoIP call destination such that the succession forms a series of simulated VoIP streams, wherein each simulated VoIP stream uses a VoIP protocol corresponding to a VoIP protocol supported by the VoIP call destination;
    for each initiated simulated VoIP stream, determining whether the VoIP stream was successful; and
    estimating the upstream bandwidth based upon the known data rates of the simulated VoIP streams preceding an unsuccessful VoIP stream.

17. The method of claim 16, wherein the successive initiation is such that during each successive simulated VoIP stream in the series, simulated VoIP streams preceding the successive simulated VoIP stream are maintained with the VoIP call destination.

18. The method of claim 16, wherein the successive initiation is such that during each successive simulated VoIP stream in the series, VoIP streams preceding the successive simulated VoIP stream are not maintained with the VoIP call destination.

* * * * *